March 16, 1954     J. H. HOBGOOD     2,672,259
COMBINED TOP DRESSER AND SOWER
Filed Oct. 5, 1951     2 Sheets-Sheet 1
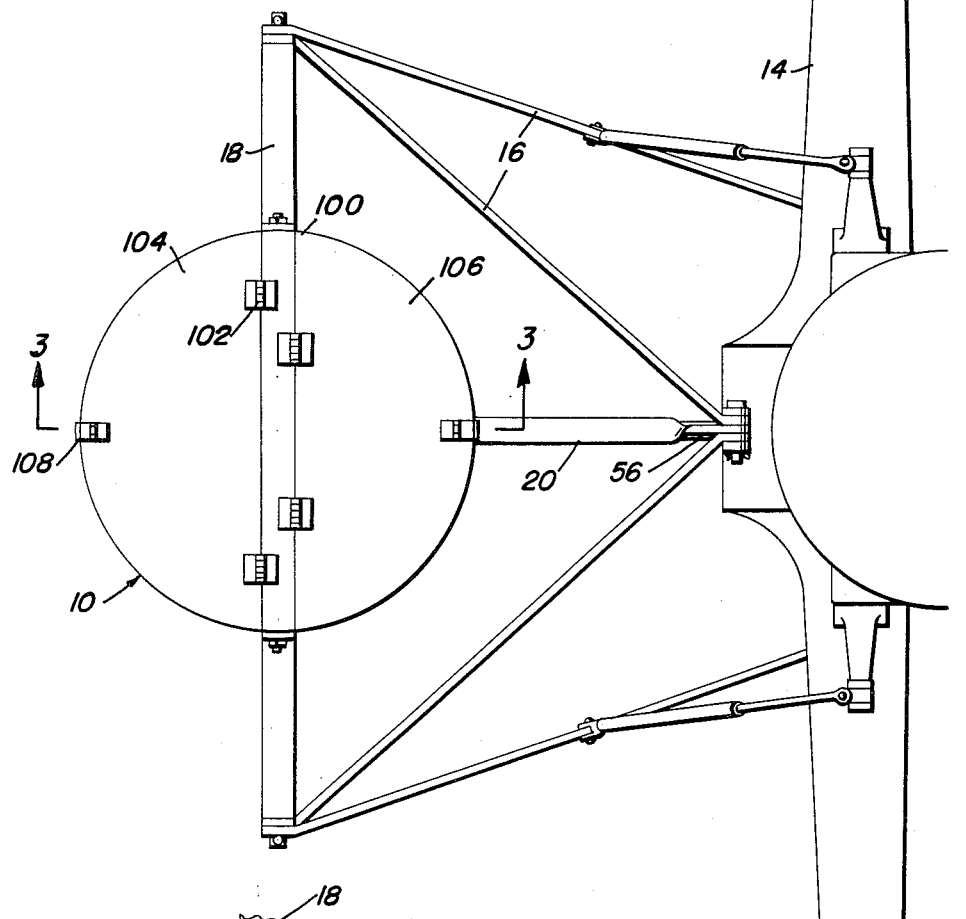
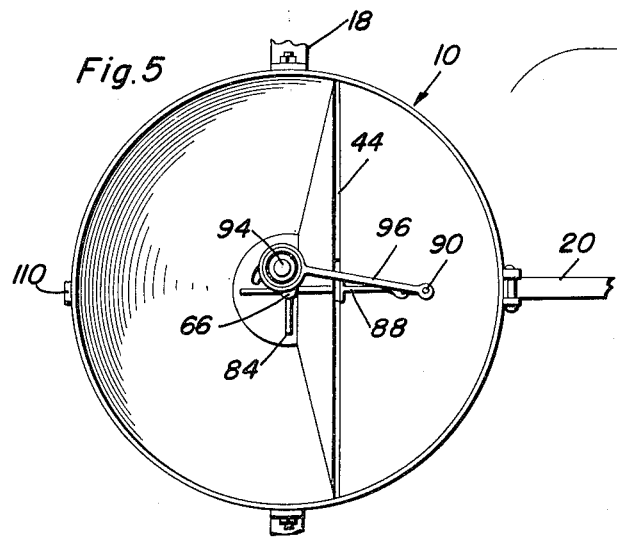
Joseph H. Hobgood
INVENTOR.

March 16, 1954  J. H. HOBGOOD  2,672,259
COMBINED TOP DRESSER AND SOWER
Filed Oct. 5, 1951  2 Sheets-Sheet 2
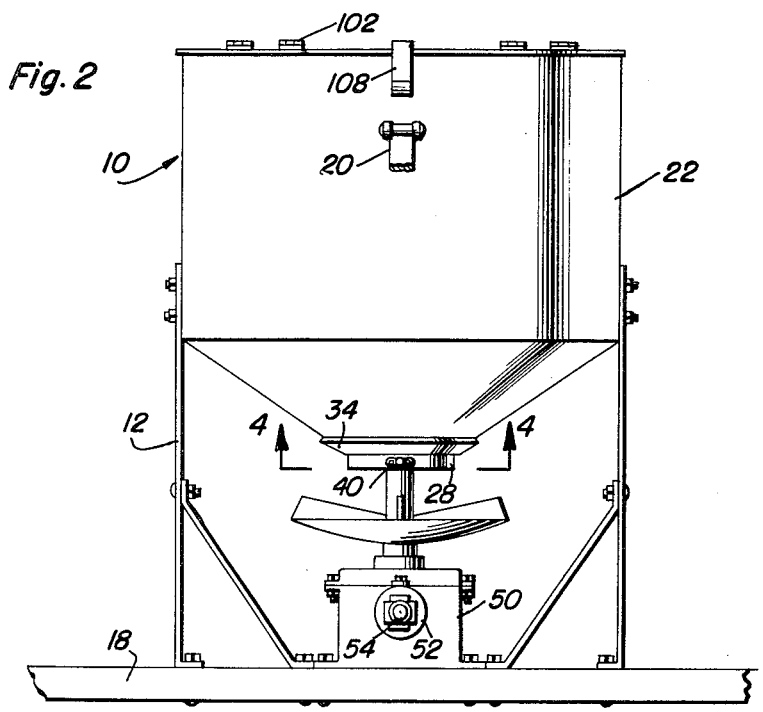
Fig. 2
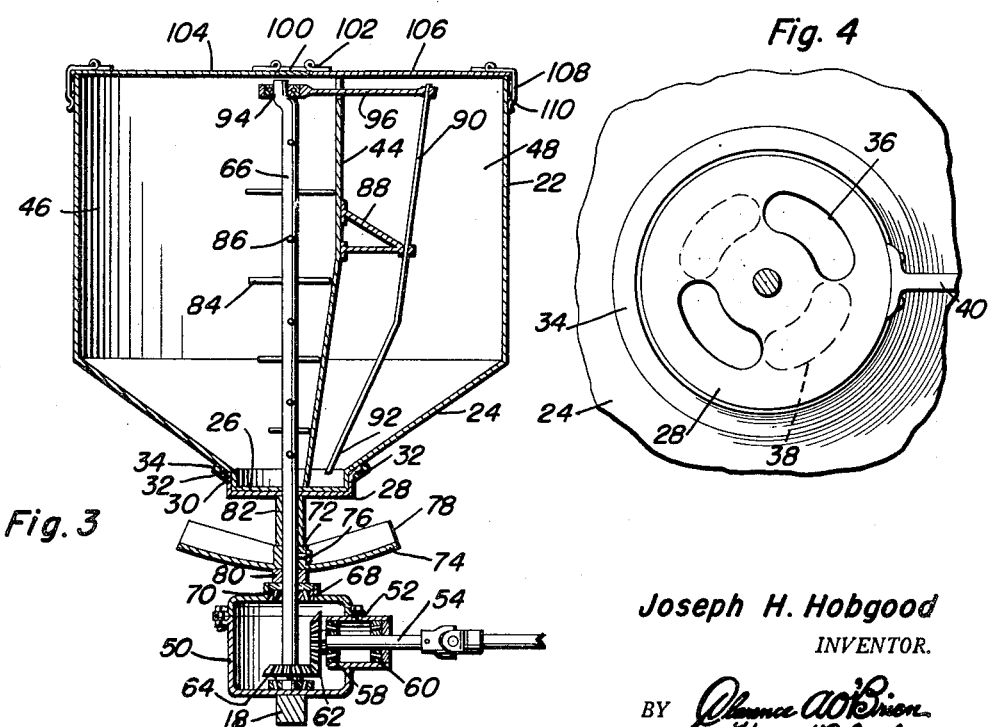
Fig. 3
Fig. 4
Joseph H. Hobgood
INVENTOR.

Patented Mar. 16, 1954

2,672,259

UNITED STATES PATENT OFFICE 2,672,259

COMBINED TOP DRESSER AND SOWER

Joseph H. Hobgood, Buffalo Junction, Va.

Application October 5, 1951, Serial No. 249,911

3 Claims. (Cl. 222—135)

This invention relates to a combined top dresser and seeder and particularly to a device to be mounted on a motor vehicle having a power take-off for operating the seeder.

In spreading fertilizer, sowing seed and other similar operations, it is customary to use a seed hopper device and an impeller disk or spreader mounted below the hopper for scattering the material distributed by the hopper. This has necessitated frequent repassage over the field in order to apply the top dressing and the various seeds.

This invention provides a machine for simultaneously applying top dressing and scattering the seed. This is accomplished by means of a hopper having a plurality of partitions, one of which contains the top dressing material and the other contains one or more varieties of seeds. Both the top dressing and the seeds are distributed through suitable openings to an impeller disk or scatterer which scatters the seeds and the top dressing simultaneously so that only one passage is necessary in order to complete the job.

It is, accordingly, an object of this invention to provide an improved top dresser and seeder.

It is a further object of this invention to provide a device for simultaneously scattering top dressing and seeds.

It is a further object of this invention to provide a combined top dresser and seeder which is readily mounted on a tractor device and operated by the power take-off thereof.

It is a further object of this invention to provide an improved agitator for a seeder.

It is a further object of this invention to provide an improved control passage for a seeder.

Other objects and advantages of this invention will be apparent from the following detailed description taken in conjunction with the accompanying drawings, in which Figure 1 is a top plan view of the dresser and seeder showing the attachment to a tractor;

Figure 2 is a part elevation of the dresser and seeder;

Figure 3 is a vertical section taken substantially on the plane indicated by the line 2—3 of Figure 1;

Figure 4 is a bottom view of the hopper; and

Figure 5 is a top plan view of the hopper with the cover removed.

In the exemplary embodiment of the invention, a hopper 10 is mounted on a framework 12 which, in turn, is attached to a tractor 14 by means of suitable braces 16, both the frame 12 and the braces 16 being connected to a bottom plate 18, an auxiliary brace 20 from the portion of the tractor adjacent the power take-off to the top of the hopper steadies and rigidifies the hopper.

The hopper 10 is comprised of an upper substantially cylindrical portion 22 and the converging wall portions 24 are substantially frusto-conical in construction, producing a terminus or reduced bottom area 26 which is preferably substantially a short cylindrical section.

A cap 28 is applied to the terminus or bottom portion and substantially snugly engages the same. The upstanding side walls 30 of the cap terminate in a laterally extending annular flange 32 which is angularly directed so that it lies substantially smoothly against the sloping wall portion 24. An annular bracket 34 is connected to the sloping wall portion and overlies the flange 32 so that the cap 28 is rotatably mounted in the flange and adjacent to and in proximity with the front of the bottom portion 26. The cap 28 is provided with a plurality of openings 36, while the bottom portion 26 is provided with a plurality of openings 38. The handle 40 is connected to the cap 28 so that it may be rotated to determine the amount of registry between the openings 36 and 38 which thereby determines the amount of flow of material from the hopper.

The hopper 10 is divided into a plurality of compartments by means of a partition 44 which is offset from the median line of the hopper so that the hopper is divided into a plurality of compartments 46 and 48 of unequal size. The partition 44 not only divides the hopper but also extends across the reduced bottom portion so that the bottom portion is also in communication with each of the compartments 46 and 48.

Mounted below the hopper 10 on the plate 18 is a gear box 50 having an opening 52 in one side, through which extends a shaft 54 which is connected to the power take-off 56 of the tractor 14. Suitable anti-friction bearings 58 and 60 are mounted on the shaft 54 and a bevel gear 62 is connected on the end of the shaft 54 and drives a bevel gear 64 mounted on a shaft 66, having one end journaled in the gear box 50 and extending upwardly through a top passage in the gear box having an anti-friction bearing 70 therein. The shaft 66 extends upwardly through the cap 28 and the bottom 26 substantially to the top of the hopper 10 and is preferably arranged axially therein.

The hub 72 of an impeller disk 74 is rigidly connected to the shaft by suitable means such as the setscrew 76. The disk 74 is provided with a plurality of impeller vanes 78 for a purpose which will presently be described.

A plurality of spacer blocks 80 and 82 are placed on the shaft 66 between the gear box and the bottom of the hopper.

That portion of the shaft 66 extending substantially axially in the compartment 46 of the hopper 10 is provided with a plurality of agitators 84 in the form of pins extending through openings 86 axially spaced along the rod 66. A bracket 88 is mounted in the smaller compartment 48 of the hopper 10 and a rod-like agitator 90 is pivotally mounted on the bracket 88 preferably the lower end of the rod 90 is adjacent to the bottom portion of the container. The top portion of the shaft 66 is offset to provide a crank 94 preferably adjacent the top end thereof. A pitman 96 is journaled on the crank 94 and is connected in pivoted arrangement with the top end of the rod 90 so that rotation of the shaft 66 oscillates the rod 90 to provide an agitating motion in the smaller compartment 48.

The hopper 10 is provided with a detachable lid having a central portion 100 to which is connected by means of hinges 102, a pair of substantially identical lid sections 104 and 106, each of the lid portions 104 and 106 being provided with a spring clip 108 engaging a detent 110 mounted on the side of the container adjacent the top thereof.

In the operation of the combined top dresser and seeder, the top dressing is provided in the larger compartment 46 and the seed or seeds in the smaller compartment 48. The cap 28 is adjusted to provide the desired opening spaces so that the correct amount of top dressing and seed will be fed through these openings onto the impeller disk 74. As the vehicle 14 is traversed over the field, the power take-off will operate the shaft 54 which in turn will rotate the shaft 66, to which is rigidly connected the impeller disk 74 having the vanes 78 thereon. The top dressing and the seed falling on the disk 74 will be impelled therefrom by the impeller vanes 78 and be substantially uniformly scattered about the machine.

The agitators 84 and 90 will assure substantially constant and uniform flow of both seed and top dressing from the compartments of the hopper.

While for purposes of exemplification, a preferred embodiment of the invention has been shown and described according to the best present understanding thereof, it will be apparent that changes and modifications can be made therein, without departing from the true spirit of the invention.

Having described the invention, what is claimed as new is:

1. A combination seeder for mounting on a vehicle having a power take-off, comprising an upstanding hopper having a frusto-conical portion terminating in a reduced bottom, a partition dividing said hopper into compartments of unequal size, a gear box mounted below said hopper, a shaft axially mounted in said hopper and in the compartment of larger size, agitator means secured to said shaft, said shaft extending into said gear box, gear means operatively connecting said shaft to the power take-off, an agitator pivotally mounted substantially centrally in said compartment of smaller size, and extending from adjacent said bottom to the top of the hopper, the upper end of said shaft being off-set to provide a crank, a pitman connecting said crank to said pivoted agitator, and discharge openings in said bottom for said hopper compartments.

2. A combination seeder for mounting on a vehicle having a power take-off, comprising an upstanding hopper having a sloping bottom terminating in a flat circular terminus, a partition dividing said hopper into compartments of unequal size, a gear box mounted below said hopper, an agitator shaft axially mounted in said hopper and in the compartment of larger size, agitator means secured to said shaft, said shaft extending into said gear box, intermeshing gears operatively connecting said agitator shaft to the power take-off, a substantially vertical rod pivotally mounted on a laterally disposed bracket mounted on said partition in said compartment of smaller size and extending from adjacent the terminus to the top of the hopper, the upper end of the agitator shaft being off-set to provide a crank on said shaft, a pitman connecting said crank to said pivoted rod, a cap mounted in contact with said terminus, said cap and said terminus having spaced openings therein, said cap being rotatable to determine the register of said openings.

3. A combination top dresser and sower comprising a hopper having a frusto-conical bottom converging to a reduced neck forming an outlet, means for mounting said hopper on a vehicle having a power take-off, an upwardly extending partition dividing said hopper into a plurality of compartments each communicating with said neck, said partition being offset from the axis of said hopper, an axially positioned agitator shaft extending upwardly through said neck and said hopper, means including intermeshing gears connecting said agitator shaft in driven relation to said power take-off, agitator pins on said agitator shaft, an offset crank adjacent the top of said agitator shaft, a laterally disposed bracket mounted on said partition on the side opposite to said agitator shaft, a substantially vertically disposed agitator member pivotally mounted on said bracket and extending from adjacent the outlet neck to the top, a pitman connecting said crank to said agitator member whereby rotation of said agitator shaft causes oscillation of said agitator member.

JOSEPH H. HOBGOOD.

References Cited in the file of this patent

UNITED STATES PATENTS

| Number | Name | Date |
| --- | --- | --- |
| 1,912,172 | Bailey | May 30, 1933 |
| 2,463,855 | Crawford | Mar. 8, 1949 |
| 2,515,269 | Shaw | July 3, 1950 |
| 2,550,303 | Simpson | Apr. 24, 1951 |
| 2,550,872 | Shaw | May 1, 1951 |
| 2,553,403 | Cory | May 15, 1951 |
| 2,562,422 | Herd | July 31, 1951 |

FOREIGN PATENTS

| Number | Country | Date |
| --- | --- | --- |
| 1,495 | Australia | Apr. 19, 1926 |